(12) United States Patent
Ota et al.

(10) Patent No.: US 9,223,468 B2
(45) Date of Patent: Dec. 29, 2015

(54) DISPLAY APPARATUS, DISPLAY METHOD AND PROGRAM

(75) Inventors: Manabu Ota, Chiyoda-ku (JP); Yasuo Morinaga, Chiyoda-ku (JP); Masakatsu Tsukamoto, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 269 days.

(21) Appl. No.: 13/879,531

(22) PCT Filed: May 31, 2012

(86) PCT No.: PCT/JP2012/064236
§ 371 (c)(1),
(2), (4) Date: Apr. 15, 2013

(87) PCT Pub. No.: WO2012/169436
PCT Pub. Date: Dec. 13, 2012

(65) Prior Publication Data
US 2013/0239034 A1    Sep. 12, 2013

(30) Foreign Application Priority Data
Jun. 9, 2011 (JP) ................................. 2011-129326

(51) Int. Cl.
*G06F 13/00* (2006.01)
*G06F 15/00* (2006.01)
*G06F 3/0481* (2013.01)
*G06F 17/30* (2006.01)

(52) U.S. Cl.
CPC ...... *G06F 3/04817* (2013.01); *G06F 17/30905* (2013.01)

(58) Field of Classification Search
CPC ........................ G06F 3/04817; H04M 1/72586

USPC ................... 715/763–765, 810, 840, 740
See application file for complete search history.

(56) References Cited

U.S. PATENT DOCUMENTS

2003/0063128 A1* 4/2003 Salmimaa et al. ............ 345/810
2004/0204845 A1* 10/2004 Wong ............................ 701/210

FOREIGN PATENT DOCUMENTS

EP        2 184 736 A1    5/2010
JP        2001 202178     7/2001

OTHER PUBLICATIONS iPadiPhoneWire, Aozora Slider—Me de Tanoshimu Shukan Tenki Yoho—, Mynavi Corp., (Dec. 14, 2009) (with partial English translation).

(Continued)

*Primary Examiner* — Kevin Nguyen
(74) *Attorney, Agent, or Firm* — Oblon, McClelland, Maier & Neustadt, L.L.P.

(57) ABSTRACT

A display apparatus communicatively connected to a distribution apparatus. The display apparatus storing one or more information contents of external information distributed from the distribution apparatus and/or internal information of the display apparatus, an icon associated with each of the information contents, a placement area for placing the icon, and one or more templates having one or more placement areas for placing icons; determining which of the information contents and the icons are to be displayed; selecting a template where the determined information contents and icons are displayable; and generating and displaying an image to be displayed by embedding the determined icon in a placement area of the selected template corresponding to a placement area associated with the determined icon.

10 Claims, 10 Drawing Sheets

(56) References Cited

OTHER PUBLICATIONS

International Search Report Issued Aug. 21, 2012 in PCT/JP12/64236 Filed May 31, 2012.

Extended Search Report issued Jan. 12, 2015 in European Patent Application No. 12796022.7.

Combined Chinese Office Action and Search Report issued Jun. 2, 2015 in Patent Application No. 201280003934.X (with English language translation).

* cited by examiner

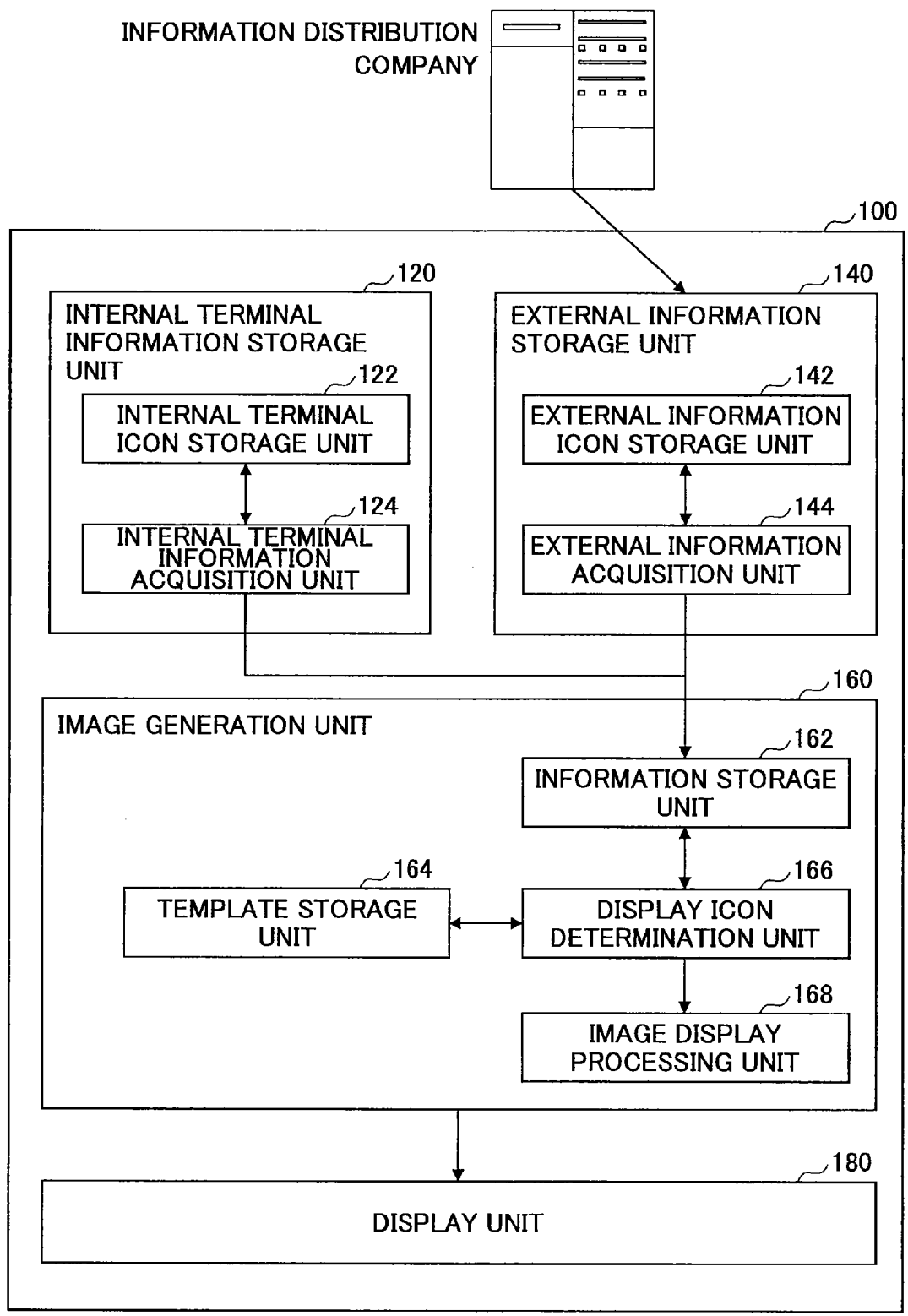

FIG.4

| No. | \multicolumn{3}{l|}{EXTERNAL INFORMATION & INTERNAL TERMINAL INFORMATION} | \multicolumn{3}{l|}{REPRESENTATION METHODS} |
|---|---|---|---|---|---|---|
| | GENERAL ITEM | SPECIFIC ITEM | CONTENTS | ARRANGED AREA | ICON | SUPPLEMENT |
| 1 | WEATHER INFORMATION | WEATHER | FAIR | WEATHER AREA | SUNSHINE | GETTING THE SUN ON THE WHOLE SCREEN |
| | | | RAINY | WEATHER AREA | RAIN | RAINING ON THE WHOLE SCREEN |
| | | | | PERSON AREA | UMBRELLA | PERSON OPEN AN UMBRELLA |
| | | | | VACANT SPACE AREA | PUDDLE | THERE IS PUDDLE |
| | | TEMPERATURE | HOT | PERSON AREA | CLOTHING | WEAR LESS CLOTHING |
| | | | | PERSON AREA | JUICE | HAVE JUICE |
| | | WARNINGS & OTHERS | STRONG WIND | WEATHER AREA | DIRT | DIRT FLIES ON THE WHOLE SCREEN |
| | | | | WEATHER AREA | LEAVES | LEAVES FLY ON THE WHOLE SCREEN |
| | | | POLLEN | BUILDING AREA | CEDAR | LARGE AMOUNT OF POLLEN FLIES FROM CEDAR |
| | | | | PERSON AREA | MASK | PERSON WEARS MASK |
| 2 | GARBAGE COLLECTION DAY | | GARBAGE | STREET AREA | GARBAGE TRUCK | TRUCK STOPS |
| | | | | PERSON AREA | TRASH BAG | HOLDING TRASH BAG |
| | | | LARGE GARBAGE | VACANT SPACE AREA | LARGE TRASH | PUTTING LARGE TRASH |
| 3 | STREET | ROUTE OOTH | CROWDED | STREET AREA | CARS | LINE OF CARS STOPPED |
| | | | EMPTY | STREET AREA | CARS | SEVERAL CARS MOVE SMOOTHLY |
| 4 | RAILWAY | OOLINE | ARRIVAL TIME | RAILWAY AREA | TRAIN | REPRESENTED BY DISTANCE TO STATION |
| | | | ACCIDENT | ACCIDENT AREA | CONSTRUCTION | |

FIG.10

| DISTRIBUTION INFORMATION | WEATHER INFORMATION: RAIN AND GARBAGE DAY INFORMATION | WEATHER INFORMATION: RAIN, GARBAGE DAY INFORMATION AND TRAFFIC INFORMATION |
|---|---|---|
| SELECTED TEMPLATE | PERSON | RAILWAY / CAR / PERSON |
| CANDIDATE IMAGE (SOLID-FRAMED IMAGE IS FINALLY SELECTED) | ⋮ | ⋮ |
| REMARKS | SINCE TRASH BAG IN THE RAIN IS NOT SO VISIBLE, UMBRELLA IS USED | IF TRASH BAG IS DISPLAYED TOGETHER WITH TRAIN, DISPLAY SIZE OF TRASH BAG IS TOO SMALL. GARBAGE TRUCK IS USED |

DISPLAY APPARATUS, DISPLAY METHOD AND PROGRAM

TECHNICAL FIELD

The present invention relates to a display apparatus, a display method and a program for displaying information.

BACKGROUND ART

Currently, services for notifying users of various information are provided in a display terminal such as a mobile phone or a personal computer by displaying on a desktop various information items acquired via the Internet or various data within a mobile terminal. For example, there are services and techniques that notify users of various information items by displaying the information items on a desktop screen, for example, a RSS reader for displaying information on the Internet such as news releases, blogs etc. or a widget for displaying weather information, stock information or others.

FIG. 1 is a schematic view for illustrating an image generation operation in a conventional mobile terminal. As illustrated in FIG. 1, the conventional mobile terminal periodically receives various information items from distribution servers of information distribution companies. Such distribution information items may typically include weather information, news, stock information, event information, traffic information and so on. The mobile terminal executes notification applications corresponding to the various information items and generates images to be displayed on the mobile terminal based on the received distribution information items and internal information stored in the mobile terminal. The generated images are displayed on a screen of a display device for the individual notification applications as illustrated in FIG. 1.

SUMMARY OF INVENTION

Problem to be Solved by the Invention

However, the information is mainly displayed in texts, and there are some problems in that it is difficult to display sufficient amounts of information due to a limited display area and a limited character size or if there are many characters, it takes more time for a user to read the information.

In order to address the problems, one object of the present invention is to provide a technique for displaying various information items in easily recognizable form for the user.

Means for Solving the Problem

In order to overcome the above object, one aspect of the present invention relates to a display apparatus communicatively connected to a distribution apparatus, comprising: an information storage unit configured to store one or more information contents of external information distributed from the distribution apparatus and/or internal information of the display apparatus, an icon associated with each of the information contents and a placement area for placing the icon; a template storage unit configured to store one or more templates having one or more placement areas for placing icons; a display icon determination unit configured to determine which of the information contents and the icons from the information storage unit are to be displayed and select from the template storage unit a template where the determined information contents and icons are displayable; and an image generation and display unit configured to generate and display an image to be displayed by embedding the determined icon in a placement area of the selected template corresponding to a placement area associated with the determined icon.

Advantage of the Invention

According to the present invention, it is possible to provide the technique for displaying various information items in easily recognizable form for the user.

BRIEF DESCRIPTION OF DRAWINGS

FIG. 3 is a block diagram for illustrating a mobile terminal according to one embodiment of the present invention;

FIG. 4 illustrates an exemplary management form of various information items managed in an information storage unit;

FIG. 10 is a schematic diagram of an image selection operation according to one embodiment of the present invention.

EMBODIMENTS FOR CARRYING OUT THE INVENTION

Embodiments of the present invention are described below with reference to drawings.

Figure 1:
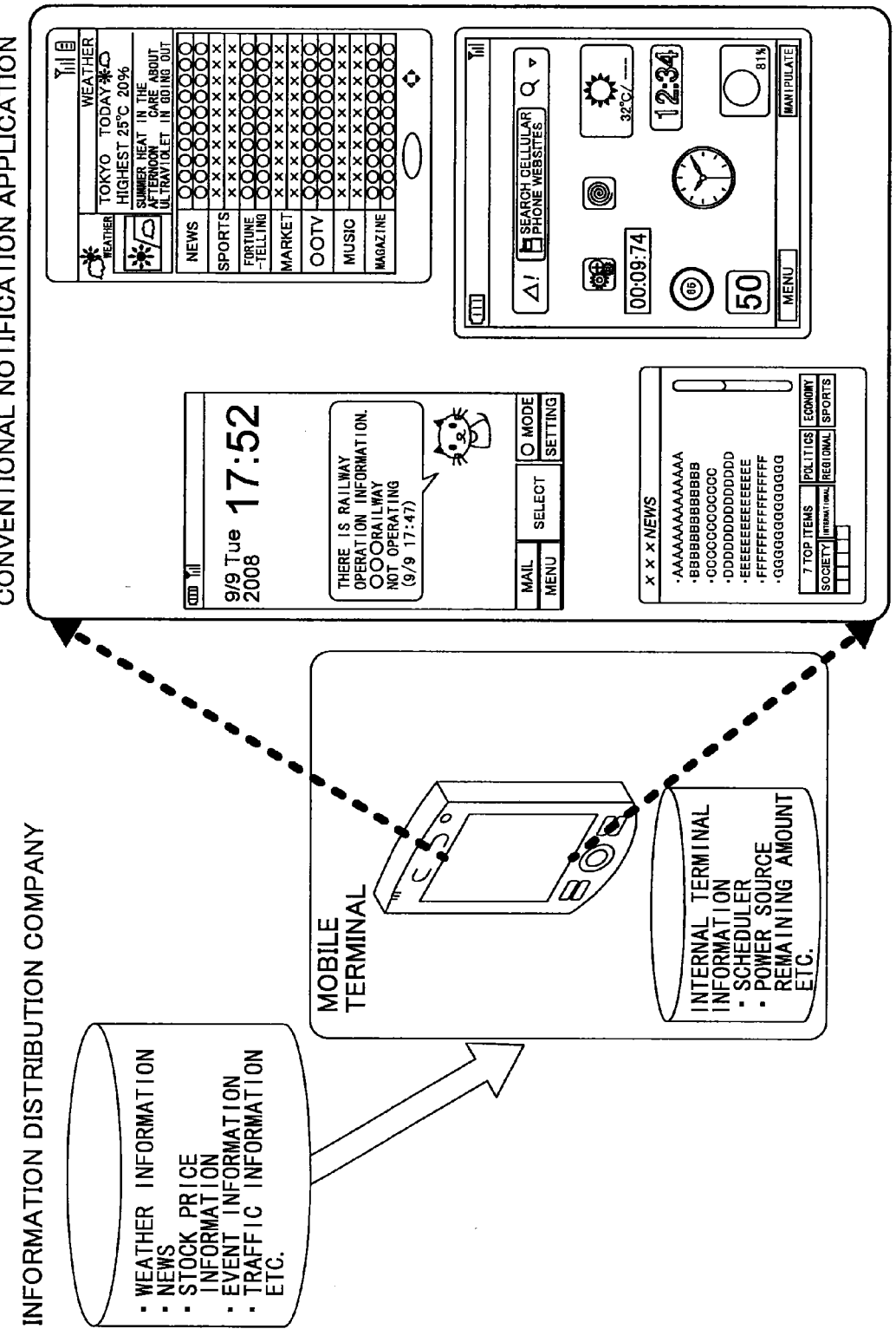
FIG. 1 is a schematic diagram for illustrating an image generation operation in a conventional mobile terminal.
Figure 2:
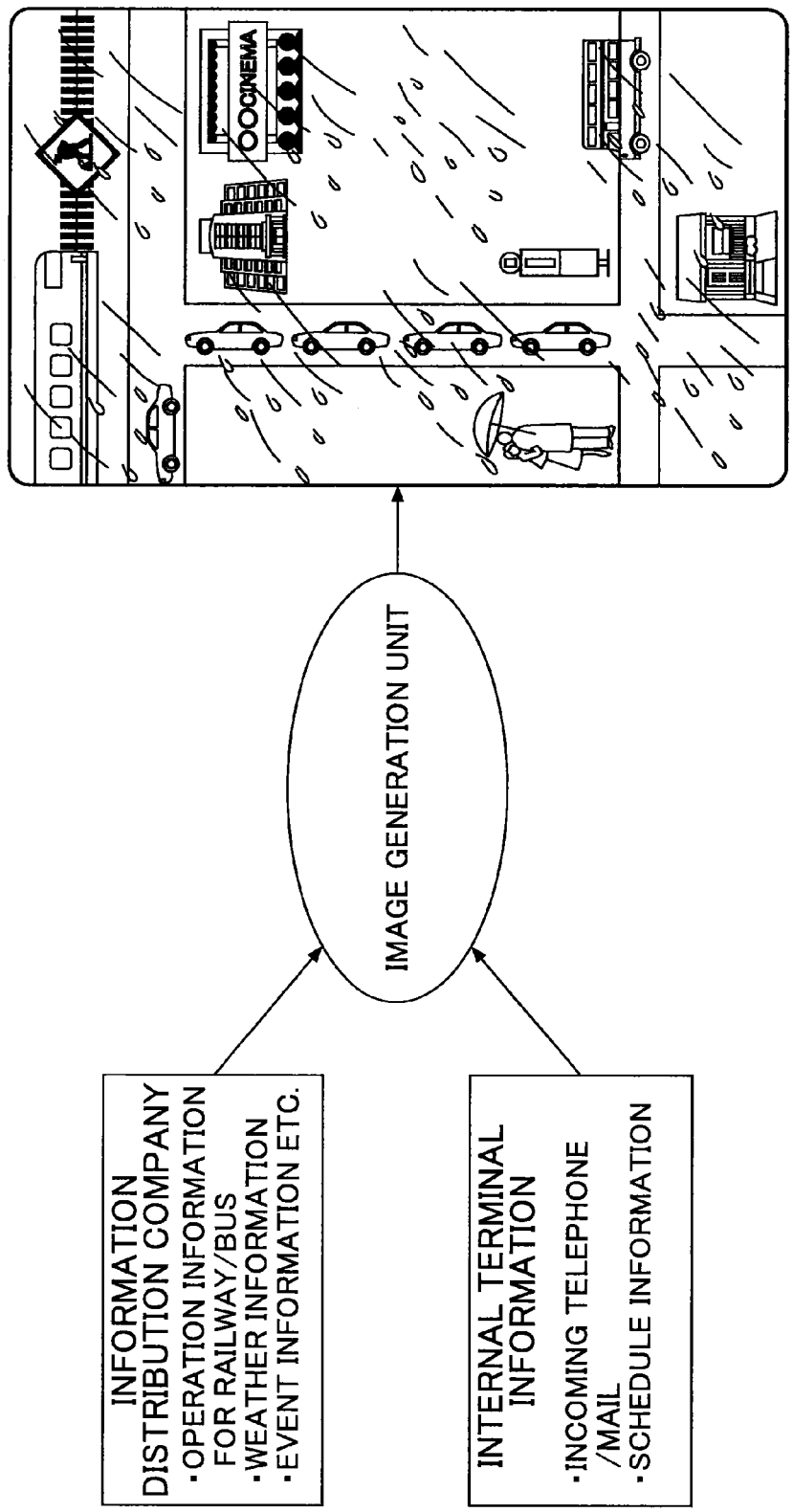
FIG. 2 is a schematic diagram for illustrating an image generation operation in a mobile apparatus according to the present invention.

FIG. 2 is a schematic diagram for illustrating an image generation operation in a mobile apparatus of the present invention. As illustrated in FIG. 2, in embodiments of the present invention, a mobile terminal receives various information items from distribution servers of information distribution companies and generates and displays one visually aggregated image from the various information items based on the received distribution information and user information or device information within the mobile terminal. Thereby, a user can not only check the various information items by viewing the displayed single image but also intuitively recognize the various information items through the visualized image displayed in icons.

Next, an arrangement of a mobile terminal according to one embodiment of the present invention is described with reference to FIG. 3. A mobile terminal of this embodiment is typically a mobile information terminal such as a mobile phone terminal or a smart phone. The mobile terminal uses installed applications to receive various information items distributed from external distribution apparatuses such as distribution servers of information distribution companies via a network (not illustrated). The mobile terminal typically includes one or more of various hardware resources such as an auxiliary storage device, a memory device, a CPU, a communication device, a display device and an input device. The auxiliary storage device consists of a hard disk, a flush memory or others and stores programs or data for implementing various operation as stated below. The memory device consists of a RAM (Random Access Memory) or others and upon an activation instruction of a program, reads the program from the auxiliary storage device and stores it. The CPU serves as a processor for processing information and implements various functions as stated below in accordance with the programs stored in the memory device. The communication device consists of various communication circuits for wired and/or wireless connection to other devices such as a server via a network. The display device consists of a LCD display and displays images or others generated based on the distributed information received via the network. The input device typically consists of manipulation buttons, a keyboard, a mouse or others and is used for a user to input various manipulation commands to the mobile terminal. Note that the mobile terminal according to the present invention is not limited to the above-stated hardware arrangement and may include any other appropriate hardware arrangement such as a circuit for enabling various functions as stated below to be implemented.

Also, the present invention is described in embodiment below by using a mobile terminal but is not limited to the mobile terminal. The present invention may be any other appropriate device that can display distributed information. For example, the present invention can be applied to any device that can display received information such as a personal computer or a TV set.

FIG. 3 illustrates an exemplary functional arrangement of a mobile terminal according to one embodiment of the present invention. In FIG. 3, a mobile terminal 100 is communicatively connected to a distribution server of an information distribution company and includes an internal terminal information storage unit 120, an external information storage unit 140, an image generation unit 160 and a display unit 180.

The internal terminal information storage unit 120 stores as internal terminal information user information regarding a user of the mobile terminal 100 such as user's schedule information, telephone/mail information or others and device information such as a remaining amount of a power source, position information, time information or others.

The internal terminal information storage unit 120 includes an internal terminal icon storage unit 122 and an internal terminal information acquisition unit 124. The internal terminal icon storage unit 122 stores icon image information of various icons for displaying the internal terminal information on a display device of the mobile terminal 100. The icon image information may be initially stored in the mobile terminal 100 or downloaded via a network as needed. The internal terminal information acquisition unit 124 acquires and stores various internal terminal information items such as the user information or the device information. For example, the user information may be directly supplied from the user of the mobile terminal 100 via an input device or may be acquired via the network. The device information is typically acquired from an operating system of the mobile terminal 100.

The external information storage unit 140 stores as external information distributed various information items received from the distribution server of the information distribution company. The external information typically includes weather information, news, stock information, event information, traffic information and so on.

The external information storage unit 140 includes an external information icon storage unit 142 and an external information acquisition unit 144. The external information icon storage unit 142 stores icon image information of various icons for displaying the external information on the display device of the mobile terminal 100. The icon image information may be initially stored in the mobile terminal 100 or downloaded from a distribution server serving as a distribution source of the external information as needed. The external information acquisition unit 144 maintains various external information items acquired from the distribution servers.

As stated above, each of an internal terminal icon and an external information icon is an image to represent the internal terminal information and the external information in visually recognizable form for a user. For example, for weather information as one type of the external information, an icon for representing "sunshine" may be used to indicate information contents of "fair". Also, for the traffic information as one type of the external information, an icon for representing "construction" may be used to indicate information contents of occurrence of an "accident". Also, multiple icons may be prepared to represent the same information contents. For example, for the weather information as one type of the external information, icons for representing "rain", "umbrella", "puddle" and so on may be prepared to indicate information contents of "rainy". Also, for garbage collection day of user's schedule information as one type of the internal terminal information, icons for representing a "garbage collection truck", a "trash bag" and so on may be used to indicate information contents of "garbage".

The image generation unit 160 aggregates various external information contents received from a distribution server of an information distribution company and/or various internal terminal information contents into a single image and displays these information contents in icons within the image. The image generation unit 160 includes an information storage unit 162, a template storage unit 164, a display icon determination unit 166 and an image display processing unit 168.

The information storage unit 162 stores internal terminal information contents and internal terminal information icons provided from the internal terminal information storage unit 120 as well as external information contents and external information icons provided from the external information storage unit 140. The information storage unit 162 manages the provided information and data in any appropriate management form for the image generation operation in the image generation unit 160. For example, the information storage unit 162 may manage various information contents provided from the internal terminal information storage unit 120 and the external information storage unit 140 in a management table as illustrated in FIG. 4. In the management table as illustrated in FIG. 4, the external information and the internal terminal information are classified into general items corresponding to information sources and information types such as "weather information", "garbage collection day", "street", "railway" and so on. Furthermore, each of the classified general items may be further classified into more specific items as needed. For example, "weather information" may be subdivided into specific items such as "weather", "temperature", "warnings & others" and so on. Furthermore, various information contents corresponding to each of the general items or the specific items are set. For example, the information contents such as "fair", "rainy" and so on are set for "weather". Also, the information contents such as "garbage", "large garbage" and so on are set for "garbage collection day".

As stated above, various icons for representing these information contents are prepared. In the management form as exemplarily illustrated in FIG. 4, one or more icons may be registered for each of the information contents, and a placement area and an icon image may be registered for each icon. For example, the "sunshine" icon where the sun is shining in the whole screen is set as the information contents of "fair", and "weather area" is set as the placement area. Here, the placement area represents an area where that icon is placed in the image. As stated below, each icon is embedded in a prepared template, and various areas defining types of icons arranged in the template are set. For example, an icon associated with "weather area" is displayed in "weather area" on the template. Similarly, an icon associated with "street area" is displayed in "street area" on the template, and an icon associated with "person area" is displayed in "person area" on the template. Note that the present invention is not limited to the management table as illustrated in FIG. 4 and that any other appropriate data form that can be stored in association with each information content, icon and placement area may be used.

The template storage unit 164 stores one or more templates for use as base information where various icons are placed. Each of the templates includes one or more placement areas for embedding icons. In each of the placement areas, an attribute of an icon that can be embedded in the placement area is defined. For example, an icon associated with "person area" is embedded in "person area" of a template, and an icon associated with "weather area" is embedded in "weather area" of the template.

The display icon determination unit 166 determines one or more information contents to be displayed and icons associated with the information contents and selects a template suitable for the determined icons. In one embodiment, the display icon determination unit 166 determines how many information contents of the internal terminal information and the external information are stored in the information storage unit 162 and performs an aggregation operation, a deletion operation or others as stated below to determine which of the information contents is to be displayed such that the determined number of information contents is less than or equal to a predefined number of information contents that a user can recognize on the display device.

The above determination operation of icons and templates by the display icon determination unit 166 may be periodically performed at a predefined time interval or whenever new information is distributed from a distribution server. Also, in order to avoid updating display images frequently, the display icon determination unit 166 may perform the above icon and template determination operations only if information to be displayed to a user with a high priority is distributed or updated.

Upon determining the information contents to be displayed in this manner, the display icon determination unit 166 determines an appropriate template among various templates stored in the template storage unit 164 based on the determined type and number of information contents. In one embodiment, the display icon determination unit 166 determines an available icon and a placement area of the icon for each information content determined for display with reference to the management table stored in the information storage unit 162 and selects a template having the least number of placement areas among templates at least having placement areas where the determined information contents and icons can be displayed. The selected template would be necessary and sufficient to display the icons.

The image display processing unit 168 superposes each of the icons for display determined by the display icon determination unit 166 onto the corresponding placement area of the selected template to generate one image for display on the display device. Also, the image display processing unit 168 may evaluate the visibility of the generated image and cause the display icon determination unit 166 to reselect icons and a template for display so as to generate a new image instead of the image evaluated to have less visibility.

The display unit 180 displays the image data generated by the image display processing unit 168 on the display device. The display unit 180 may display the generated image data on the whole screen of the display device. Alternatively, the display unit 180 may resize the image data for display in any appropriate display form such as a window form or a layer form and display the resized image data in a predefined area on the display device.

Figure 5:
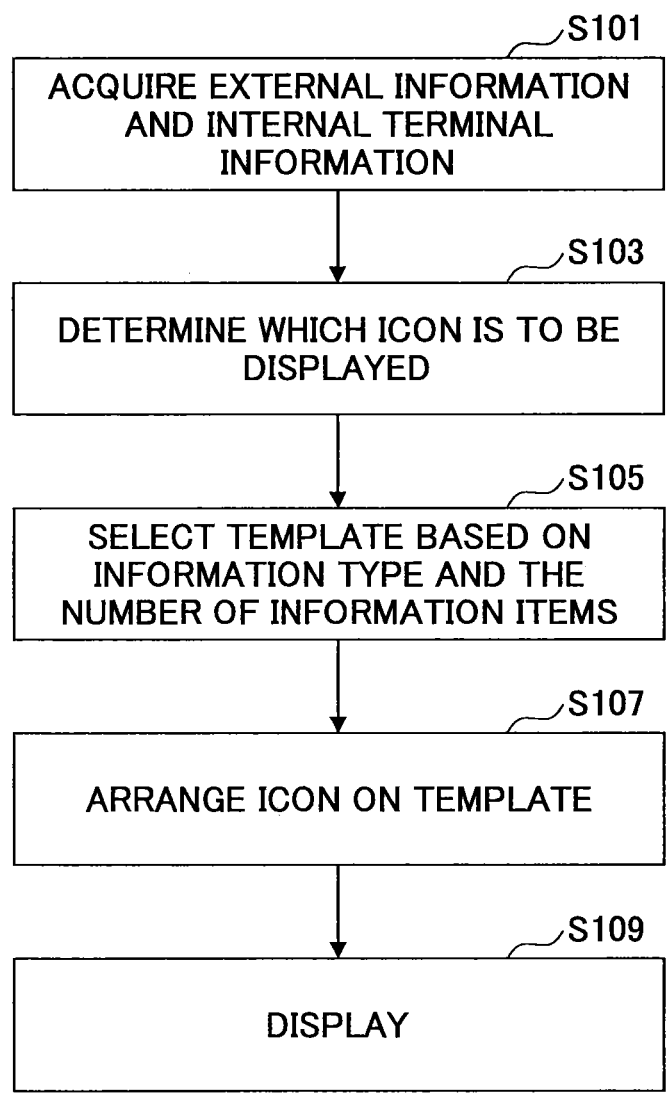
FIG. 5 is a flow diagram for illustrating an image generation operation according to one embodiment of the present invention.

An image generation operation by a mobile terminal according to one embodiment of the present invention is described with reference to FIGS. 5-8. FIG. 5 is a flow diagram for illustrating an image generation operation according to one embodiment of the present invention.

As illustrated in FIG. 5, at step S101, the mobile terminal 100 acquires external information from a distribution server of an information distribution company as well as acquires and stores user information such as user's incoming schedule information and/or device information such as a battery remaining amount of the mobile terminal 100.

At step S103, the mobile terminal 100 determines one or more information contents for display from the stored external information and internal terminal information as well as icons for representing the information contents as stated below with reference to FIG. 6.

At step S105, the mobile terminal 100 selects a template for embedding the information contents and the icons determined to be displayed from one or more stored templates. Specifically, the mobile terminal 100 determines an available icon for each of the determined information contents and an placement area of the icon with reference to the management table as illustrated in FIG. 4 and selects a template having the least number of placement areas where the determined information contents and icons can be displayed. For example, if the determined information contents for display and the placement areas of the icons consist of two "person areas", one "building area" and two "street areas", a template having the least number of placement areas is selected from templates at least having the two "person areas", the one "building area" and the two "street areas". In other words, the template having just the two "person areas", the one "building area" and the two "street areas" is the most suitable one. If there is no template having just the two "person areas", the one "building area" and the two "street areas", a template having an empty placement area may be selected, and an additional icon may be displayed for that empty placement area. For example, an icon pluralization operation at step S205 as stated below may be performed on any information contents determined for display at step S105 to generate an icon corresponding to the empty placement area and fill the empty placement area with the icon.

Figure 7:
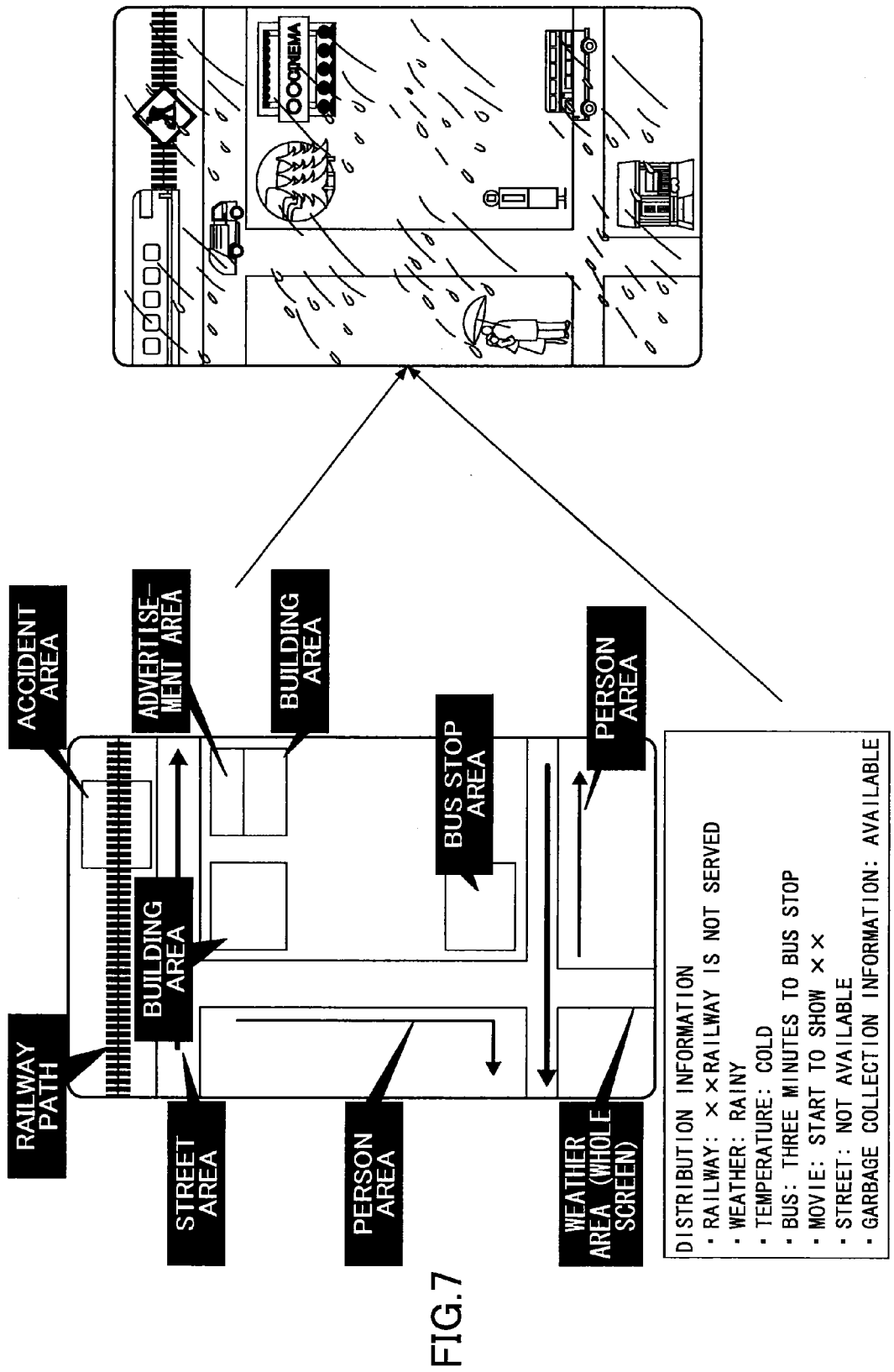
FIG. 7 is a schematic diagram of an operation for embedding information items in a template according to one embodiment of the present invention.

At step S107, the mobile terminal 100 arranges the icons for display on the selected template. In other words, the mobile terminal 100 determines the placement areas for the icons to be displayed and embeds the icons in the corresponding placement areas of the template. Specifically, the mobile terminal 100 embeds the one or more icons determined at step S103 in the placement areas of the selected template as illustrated in FIG. 7.

In other embodiments, the mobile terminal 100 may evaluate the visibility of the generated image. If the visibility is less than or equal to a predefined threshold, at step S105, the mobile terminal 100 may select another template and regenerate an image having visibility exceeding the predefined threshold. The visibility is an indicator indicative of complexity, that it, how easily users can view generated images. In general, if a less viewable and more complicated image is generated due to inclusion of a large number of icons in one placement area or superposition of multiple icons, the visibility is set to be lower. Various existing techniques such as a technique using information entropy may be used to evaluate the visibility. Also, the visibility may be determined based on the number of icons superposed onto each placement area. In other words, if a larger number of icons are superposed onto each placement area, the visibility is set to be lower. Furthermore, for icons associated with the person area, the person area is subdivided, and the icons are superposed onto each of the subdivided sub-areas. For example, in the icons illustrated in the rightmost icons in FIG. 7, the "mask", "clothing" and "trash bag" icons are superposed onto the head portion, the upper body portion and the hand portion, respectively. In such a case, the visibility may be determined based on the number of icons superposed onto each of the subdivided sub-areas. Furthermore, in evaluation of the visibility of the generated image, if greater than or equal to a predefined number of icons are superposed onto each placement area and each sub-area, it may be determined that the generated image has insufficient visibility.

At step S109, the mobile terminal 100 displays the image of the icon embedded template on the display device of the mobile terminal 100.

Figure 6:
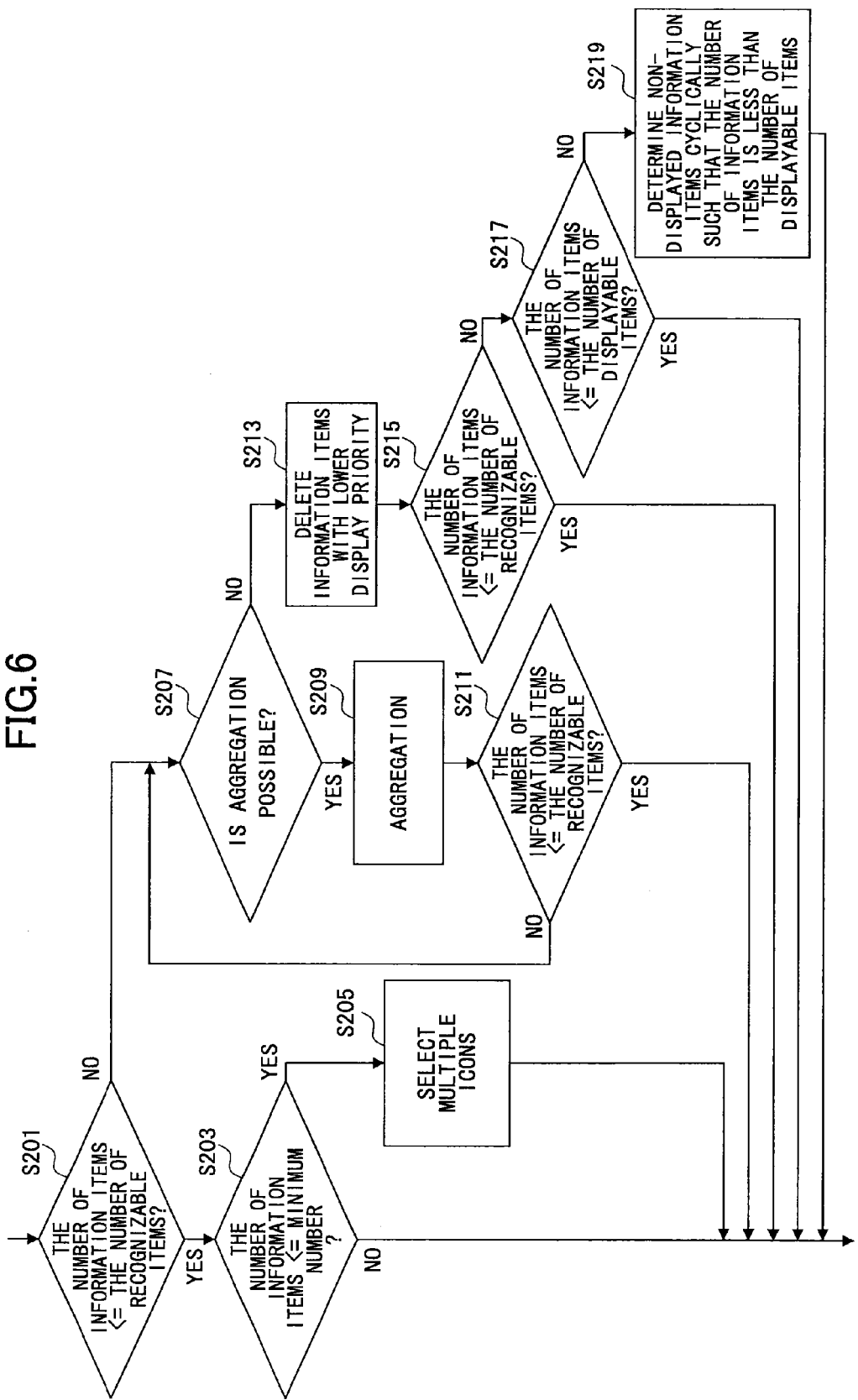
FIG. 6 is a flow diagram for illustrating an operation for determining which information item is to be displayed according to one embodiment of the present invention.

FIG. 6 is a flow diagram for illustrating an icon determination operation at step S103 in FIG. 5 in detail according to one embodiment of the present invention.

As illustrated in FIG. 6, at step S201, the mobile terminal 100 determines the number of information contents of the external information and the internal terminal information as display candidates stored in the information storage unit 102 and compares the determined number of information contents with a predefined number of information contents that a user can recognize on the display device. In general, if the predefined number of information contents is greater, the user can view more information contents on the display device simultaneously. However, since a large number of information contents would be included in one image, the generated image would become complicated, and it would be difficult to recognize each of the information contents. On the other hand, if the predefined number of information contents is smaller, the user can easily recognize the information contents from the displayed image whereas the user can view a smaller number of information contents. For this reason, the predefined recognizable number of information contents is set to such a number of information contents that the generated image is not complicated and that the user can recognize the information contents without feeling the stress. Note that the predefined recognizable number of information contents may be set to an appropriate value by default or by the user himself.

If the number of information contents as display candidates is less than or equal to the recognizable number (S201: YES), the flow proceeds to step S203. In other words, in this case, even if all the information contents as display candidates are displayed, it is considered that the user can recognize the information contents on the display device sufficiently. On the other hand, if the number of information contents as display candidates is greater than the recognizable number (S201: NO), the flow proceeds to step S207. In other words, in this case, if all the information contents as display candidates are displayed, the user has difficulty to recognize the information contents on the display device, and the number of information contents must be decreased to the predefined recognizable number.

At step S203, the mobile terminal 100 further determines whether the number of information contents as display candidates is less than or equal to a predefined minimum number. The predefined minimum number corresponds to the minimum number of icons that can provide the user with a sufficient amount of information and compose an image attractive to the user. In other words, if the number of information contents as display candidates is less than or equal to the predefined minimum number, an insufficient amount of information is provided to the user via the display device, and the displayed image would be less attractive to the user. If the number of information contents as display candidates is less than or equal to the predefined minimum number (S203: YES), the flow proceeds to step S205. On the other hand, if the number of information contents as display candidates is greater than the predefined minimum number (S203: NO), all the information contents as display candidates are determined to be displayed, and an icon for representing each of the information contents is determined with reference to the management table as illustrated in FIG. 4. For information contents having multiple icons registered, any of these icons may be determined. Alternatively, an appropriate one of the icons may be determined in consideration of placement areas of icons of other information contents. For example, if the icon associated with other information contents relates to "person area", an icon associated with "person area" may be selected from the multiple icons, and all the information contents may be displayed in a template having only "person area". On the other hand, an icon that does not overlap with icons of other information contents may be selected, and the icon may be placed in a different placement area in the template. Then, the flow proceeds to step S105 in FIG. 5.

At step S205, it is determined with reference to the management table as illustrated in FIG. 4 whether there are information contents having multiple icons registered among the information contents as display candidates, and for the information contents having multiple icons registered, the registered icons are displayed to represent the information contents. For example, in the management table in FIG. 4, the three icons "rain", "umbrella" and "puddle" are registered to display the information contents "rainy". The mobile terminal 100 may use two or more of the icons to generate an image for attractive improvement of the displayed image at step S205. For the information contents having multiple icons registered, any appropriate icon may be determined in consideration of placement areas of icons of other information contents. In this manner, the mobile terminal 100 repeats the icon pluralization operation of step S205 until the number of icons exceeds the predefined minimum number.

At step S207, the mobile terminal 100 determines whether the information contents as display candidates can be aggregated so as to reduce the number of information contents as display candidates to the predefined recognizable number. In one embodiment, the mobile terminal 100 determines the registered icons of the information contents as display candidates and the placement areas with reference to the management table in FIG. 4. If icons having a common placement area are registered for some information contents among the information contents as display candidates, the mobile terminal 100 determines that these information contents can be aggregated (S207: YES), and the flow proceeds to step S209. On the other hand, if no information content has icons registered for a common placement area among the information contents as display candidates, the mobile terminal 100 determines that the information contents cannot be aggregated (S207: NO), the flow proceeds to step S213.

Figure 8:
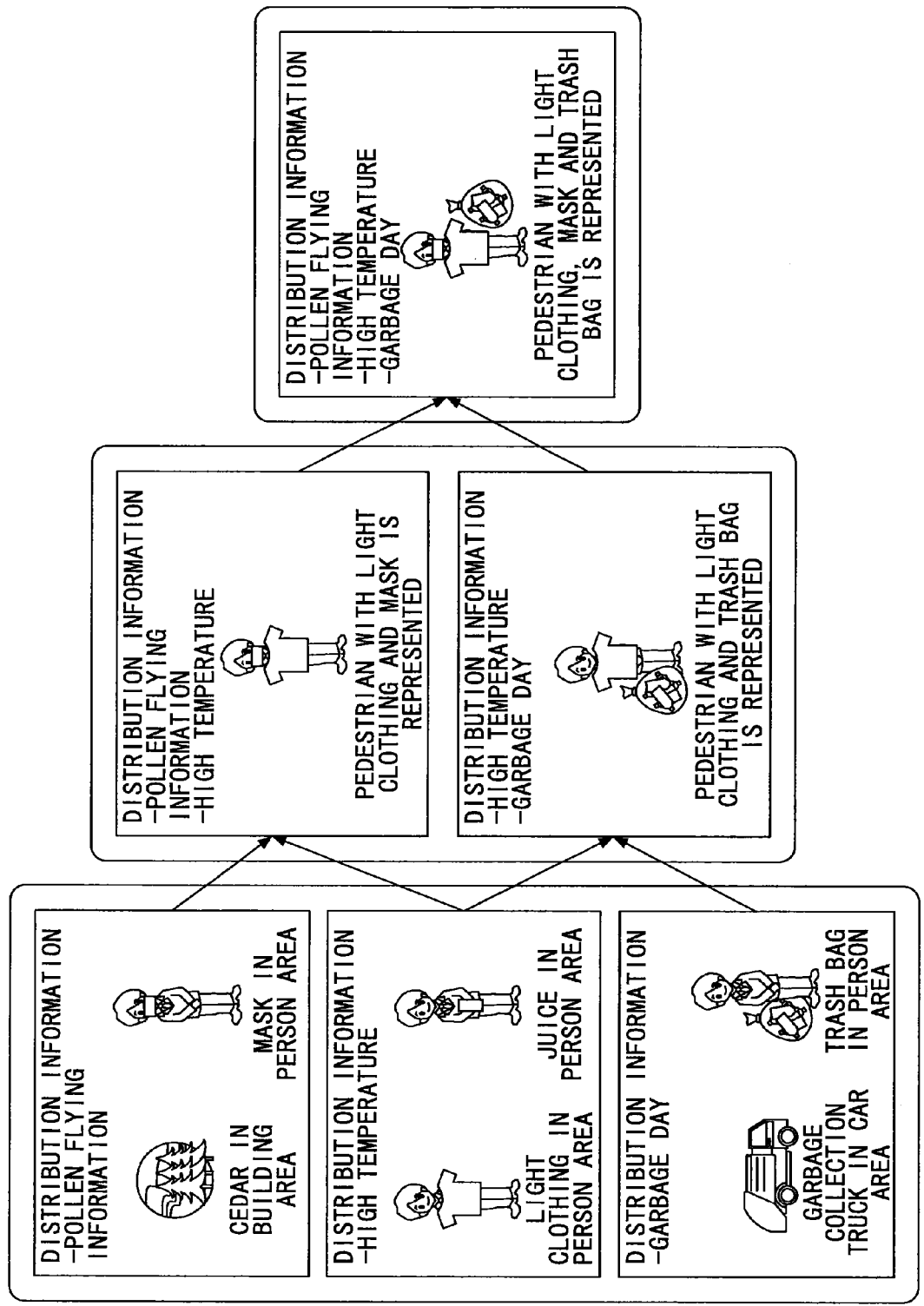
FIG. 8 is a schematic diagram of an icon aggregation operation according to one embodiment of the present invention.

At step S209, the mobile terminal 100 superposes the icons having the common placement area to aggregate the multiple information contents into one icon. This aggregation operation is described with reference to an example as illustrated in FIG. 8. As illustrated in FIG. 8, in one case where three information contents "pollen flying information", "high temperature" and "garbage day" are display candidates, the mobile terminal 100 detects with reference to the management table in FIG. 4 that an icon "cedar" and the associated placement area "building area" and an icon "mask" and the associated placement area "person area" are registered for "pollen". Similarly, the mobile terminal 100 detects an icon "light clothing" and the associated placement area "person area" and an icon "juice" and the associated placement area "person area" for "high temperature" and an icon "garbage collection truck" and the associated placement area "street area" and an icon "trash bag" and the associated placement area "person area" for "garbage". As illustrated in FIG. 8, for example, since "person area" associated with "mask" for "pollen" is the same as "person area" associated with "light clothing" for "high temperature", the mobile terminal 100 determines that these can be aggregated and aggregates the information contents "pollen flying information" and "high temperature" into one icon as illustrated in FIG. 8. Similarly, since "person area" associated with "juice" for "high temperature" is the same as "person area" associated with "trash bag" for "garbage", the mobile terminal 100 determines that these information contents can be aggregated and aggregates the information contents "high temperature" and "garbage" into one icon as illustrated in FIG. 8. The two aggregated icons may be further aggregated into one icon as illustrated in the rightmost side of FIG. 8.

Upon completing the above aggregation operation, at step S211, the mobile terminal 100 determines whether the number of aggregated icons is less than or equal to the predefined recognizable number. If the number of aggregated icons is reduced to the predefined recognizable number (S211: YES), the flow proceeds to step S105 in FIG. 5, and otherwise (S211: NO), the flow returns to step S207.

At step S213, since further aggregation of information contents is not possible, the mobile terminal 100 deletes information contents having a lower display priority from the information contents to be displayed. The display priority indicates the priority as to whether to display an icon for each of the information contents. The display priority may be defined depending on importance of the information contents. For example, the display priority may be set by a user or depending on urgency of the information contents. Also, the display priority may be dynamically set depending on display history. For example, information contents kept to be displayed for a certain time period may be set to a lower priority, and information contents that have not been displayed for the certain time period may be set to a higher priority. The display priority may be stored in association with each information content in the management table as illustrated in FIG. 4.

Upon completing the above deletion operation, at step S215, the mobile terminal 100 determines whether the number of remaining icons is less than or equal to the predefined recognizable number. If the number of remaining icons reaches the predefined recognizable number (S215: YES), the flow proceeds to step S105 in FIG. 5, and otherwise, the flow proceeds to step S217. Alternatively, in other embodiments, if step S215 is NO, the flow returns to step S213, and deletion of information contents having a lower priority may continue until the number of remaining icons is less than or equal to the predefined recognizable number.

At step S217, the mobile terminal 100 determines whether the number of remaining icons is less than or equal to a predefined displayable number. The predefined displayable number indicates the number of icons displayable on a display of the display device and may be defined depending on stored templates. In general, the number of icons displayable on the display of the display device is defined based on any factor such as configuration of an operating system of the mobile terminal 100 or the visibility. If the number of remaining icons is less than or equal to the predefined displayable number (S217: YES), the flow proceeds to step S105 in FIG. 5, and otherwise (S217: NO), the flow proceeds to step S219.

At step S219, the mobile terminal 100 selects icons such that the number of icons is less than or equal to the predefined displayable number and then determines the selected icons as a first display target information set. Furthermore, the mobile terminal 100 determines a unselected icon as a second display target information set. If further unselected icons are present, the mobile terminal 100 determines the icons as third and subsequent display target information sets. The mobile terminal 100 determines the grouped display target information sets as the display target information sets that are to be displayed sequentially or cyclically. Note that the above cyclic operation may be performed in the template selection operation at step S105.

Note that the aggregation operation, the deletion operation and the cyclic operation as stated above are not necessarily performed in the above order and that all of the three operations are not necessarily performed.

Next, an image generation operation by the mobile terminal according to another embodiment of the present invention is described with reference to FIG. 9. In the above-stated embodiments, the mobile terminal 100 generates one image, but in this embodiment, the mobile terminal 100 first generates multiple images and then provides a user with one of the images having the highest visibility.

Figure 9:
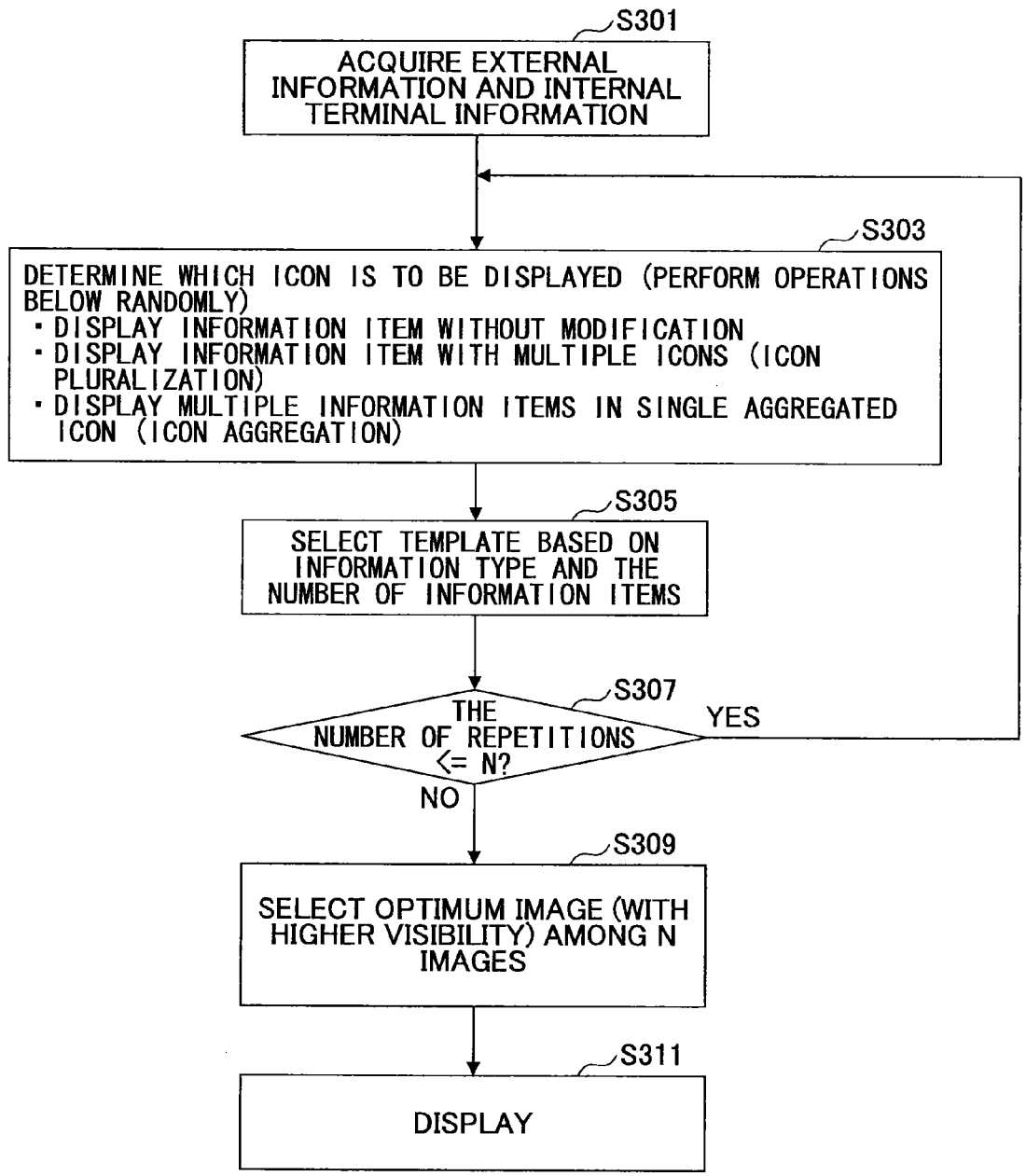
FIG. 9 is a flow diagram for illustrating an image generation operation according to another embodiment of the present invention.

FIG. 9 is a flow diagram for illustrating an image generation operation according to one embodiment of the present invention. As illustrated in FIG. 9, at step S301, the mobile terminal 100 acquires external information from a distribution server of an information distribution company as well as acquires and stores user information such as user's supplied schedule information and/or device information such as a battery remaining amount of the mobile terminal 100.

At step S303, the mobile terminal 100 determines one or more information contents to be displayed and icons for representing the information contents from the stored external information and internal terminal information. In this embodiment, 1) the mobile terminal 100 determines the stored external information and internal terminal information as display targets and also determines the corresponding icons registered in the management table in FIG. 4 as the display targets. 2) The mobile terminal 100 determines the stored external information and internal terminal information as the display targets and also determines the corresponding multiple icons registered in the management table in FIG. 4 as the display targets (icon pluralization). 3) The mobile terminal 100 determines the stored external information and internal terminal information as the display targets and aggregates the multiple information contents into one icon (icon aggregation). The mobile terminal 100 randomly selects and performs the above operations 1)-3) and determines the information contents and the icons as the display targets.

At step S305, similar to the above-stated step S105, the mobile terminal 100 selects from stored templates a template where the determined information contents and icons can be embedded. Specifically, the mobile terminal 100 determines available icons and placement areas associated with the icons for each of the determined information contents with reference to the management table as illustrated in FIG. 4 and selects a template having the least placement areas among templates having the placement areas where the determined one or more information contents and icons can be displayed.

At step S307, the mobile terminal 100 counts the number of repetitions of the icon determination operation at step S303 and the template selection operation at step S305 and determines whether the number of repetitions exceeds a predefined number N. If the number of repetitions is less than or equal to N (S307: YES), the flow returns to step S303, and the above operations are repeated. On the other hand, if the number of repetitions exceeds N (S307: NO), the flow proceeds to step S309.

At step S309, for each combination of icons and templates repeatedly determined for display at steps S303 and S305, the mobile terminal 100 embeds the icons in the templates and evaluates respective visibility of the generated images. The evaluation of respective visibility may be made in any of the above-stated methods. After the respective visibility of the generated N images is evaluated, the mobile terminal 100 determines an image having the highest visibility as a display target image.

At step S311, the mobile terminal 100 displays the determined image on the display device of the mobile terminal 100.

The above-stated visibility is further described with reference to an example. FIG. 10 is a schematic diagram of an image selection operation according to one embodiment of the present invention. As illustrated in FIG. 10, it is assumed that information contents are "rainy" and "garbage collection day" and a selected template includes only "person area" (the left side of FIG. 10). In this case, if the "rain" icon and the "trash bag" icon are superposed onto the whole area to represent the information contents "rainy", a mixture portion of "rain" and "trash bag" arises. On the other hand, if the information contents "rainy" are represented by the "umbrella" icon, there is no mixture portion of the "umbrella" icon and the "trash bag" icon, which may achieve relatively higher visibility.

Also, it is assumed that information contents are "rainy", "garbage collection day" and "train arrival" and that a template as illustrated in the right side in FIG. 10 is used. In this case, three different images can be generated. If the "train" icon and the "trash bag" icon are displayed, the display size of the "trash bag" icon becomes too small, and accordingly the visibility could be improved by representing "garbage collection day" by "garbage collection truck". In other words, the size of icons in a template may be taken into account in evaluation of the visibility.

The present invention is not limited to the above-stated specific embodiments, and variations and modifications can be made by those skilled in the art without deviating from the spirit of the present invention.

This international patent application is based on Japanese Priority Application No. 2011-129326 filed on Jun. 9, 2011, the entire contents of which are hereby incorporated by reference.

LIST OF REFERENCE SYMBOLS 100 mobile terminal
120 internal terminal information storage unit
140 external information storage unit
160 image generation unit
162 information storage unit
164 template storage unit
166 display icon determination unit
168 image display processing unit
180 display unit

The invention claimed is:

1. A display apparatus communicatively connected to a distribution apparatus, comprising:
    circuitry configured to
        store one or more information contents of external information distributed from the distribution apparatus and/or internal information of the display apparatus, an icon associated with each of the information contents and a placement area for placing the icon;
        store one or more templates having one or more placement areas for placing icons;
        determine which of the information contents and the icons are to be displayed by pluralization and/or aggregation of icons associated with to-be-displayed information contents such that a number of the to-be-displayed information contents falls within a predefined range and select a template where the determined information contents and icons are displayable; and
        generate and display an image to be displayed by embedding the determined icon in a placement area of the selected template corresponding to a placement area associated with the determined icon.

2. The display apparatus as claimed in claim 1, wherein if multiple icons associated with the different information contents to be displayed have a common placement area, the circuitry aggregates the multiple icons into one icon, and embeds the aggregated icon in a placement area of the selected template corresponding to the placement area associated with the aggregated icon.

3. The display apparatus as claimed in claim 1, wherein the circuitry selects a template among the one or more templates, the template at least including placement areas required to represent the determined icons and having the least placement areas.

4. The display apparatus as claimed in claim 1, wherein the circuitry compares a number of icons to be displayed with a predefined number of information items recognizable to a user on a screen of the display apparatus and aggregates the multiple icons into one icon until the number of icons reaches the predefined recognizable number of information items.

5. The display apparatus as claimed in claim 1, wherein the circuitry compares a number of icons to be displayed with a predefined minimum number of icons and if the number of icons is less than the predefined minimum number of icons, determines multiple icons associated with the information contents to be displayed as the icons to be displayed.

6. The display apparatus as claimed in claim 1, wherein the circuitry compares a number of icons to be displayed with a predefined number of information items recognizable to a user on a screen of the display apparatus and deletes an icon associated with the information content having a lower display priority from the information contents to be displayed until the number of icons is less than or equal to the predefined recognizable number of information items.

7. The display apparatus as claimed in claim 1, wherein the circuitry evaluates visibility indicative of complexity of the generated image and if the evaluated visibility is lower than a predefined threshold, determines a further information content and a further icon to be further displayed.

8. The display apparatus as claimed in claim 7, wherein the circuitry receives a predefined number of combinations of icons to be displayed and selected templates, generates an image for each of the combinations and selects an image having the highest visibility in the generated images as the image to be displayed.

9. A method executed by a display apparatus communicatively connected to a distribution apparatus, the method comprising:

acquiring one or more information contents of external information distributed from the distribution apparatus and/or internal information of the display apparatus and storing an icon associated with each of the information contents and a placement area for placing the icon;

determining which of the information contents and the icons are to be displayed by pluralization and/or aggregation of icons associated with to-be-displayed information contents such that a number of the to-be-displayed information contents falls within a predefined range and selecting a template, where the determined information contents and icons are displayable, from one or more templates having one or more placement areas for placing the icons; and generating and displaying an image to be displayed by embedding the determined icon in a placement area of the selected template corresponding to a placement area associated with the determined icon.

10. A storage device for storing a program executed by a processor in a display apparatus communicatively connected to a distribution apparatus, the program causing the processor to:

acquire one or more information contents of external information distributed from the distribution apparatus and/or internal information of the display apparatus and store an icon associated with each of the information contents and a placement area for placing the icon;

determine which of the information contents and the icons are to be displayed by pluralization and/or aggregation of icons associated with to-be-displayed information contents such that a number of the to-be-displayed information contents falls within a predefined range and select a template where the determined information contents and icons are displayable from one or more templates having one or more placement areas for placing the icons; and generate and display an image to be displayed by embedding the determined icon in a placement area of the selected template corresponding to a placement area associated with the determined icon.

* * * * *